United States Patent
Annunziato et al.

(10) Patent No.: US 7,742,776 B2
(45) Date of Patent: Jun. 22, 2010

(54) METHOD FOR LOCATING MOBILE TERMINALS, SYSTEM AND COMPONENTS THEREFOR

(75) Inventors: Armando Annunziato, Turin (IT); Giorgio Rosenga, Collegno (IT); Stefano Salio, Pino Torinese (IT)

(73) Assignee: Telecom Italia S.p.A., Milan (IT)

( * ) Notice: Subject to any disclaimer, the term of this patent is extended or adjusted under 35 U.S.C. 154(b) by 846 days.

(21) Appl. No.: 10/516,522

(22) PCT Filed: May 28, 2003

(86) PCT No.: PCT/EP03/05629

§ 371 (c)(1),
(2), (4) Date: Nov. 30, 2004

(87) PCT Pub. No.: WO03/103323

PCT Pub. Date: Dec. 11, 2003

(65) Prior Publication Data
US 2005/0208951 A1    Sep. 22, 2005

(30) Foreign Application Priority Data
May 31, 2002    (IT) ........................ TO2002A0462
Dec. 13, 2002   (EP) ................................ 02027873

(51) Int. Cl.
*H04W 24/00*    (2009.01)
(52) U.S. Cl. ............... 455/456.2; 455/456.1; 455/423; 455/67.11; 455/456.5; 342/357.06
(58) Field of Classification Search ... 455/456.1–456.6, 455/404.2, 67.11; 342/457, 465, 387, 357.06
See application file for complete search history.

(56) References Cited

U.S. PATENT DOCUMENTS 5,155,490 A * 10/1992 Spradley et al. ........ 342/357.03

(Continued)

FOREIGN PATENT DOCUMENTS

WO    01/69956 A2    9/2001

(Continued)

OTHER PUBLICATIONS

International Search Report mailed Sep. 30, 2003 in Application No. PCT/EP03/05629.

(Continued)

*Primary Examiner*—Sharad Rampuria
(74) *Attorney, Agent, or Firm*—Banner & Witcoff, Ltd.

(57) ABSTRACT

To locate a mobile terminal (MS1, MS2, . . . ) within a mobile communication network comprising at least a radio base station (BTS1, BTS2, . . . , BTSn), a set of physical dimensions are measured, which identify, according to respective functions, the location coordinates (x, y, z) of the mobile terminal. The method comprises the steps of: generating, starting from said set of physical dimensions and respective functions, a global locating error function ($\phi$) which has a minimum for values of said locating co-ordinates (x, y, z) corresponding with the position occupied by said mobile terminal, seeking the minimum of said error function ($\phi$) by varying at least one of said locating co-ordinates (x, y, z), and locating said mobile terminal in correspondence with the value of said at least one locating co-ordinate corresponding to said minimum.

23 Claims, 2 Drawing Sheets

U.S. PATENT DOCUMENTS

| | | | |
|---|---|---|---|
| 5,293,645 A * | 3/1994 | Sood | 455/456.2 |
| 5,373,298 A * | 12/1994 | Karouby | 342/357.02 |
| 5,724,660 A * | 3/1998 | Kauser et al. | 455/456.2 |
| 5,883,598 A * | 3/1999 | Parl et al. | 342/457 |
| 5,987,329 A * | 11/1999 | Yost et al. | 455/456.1 |
| 6,252,543 B1 * | 6/2001 | Camp | 342/357.06 |
| 6,359,587 B1 * | 3/2002 | Sugiura et al. | 342/457 |
| 6,385,454 B1 * | 5/2002 | Bahl et al. | 455/450 |
| 6,728,545 B1 * | 4/2004 | Belcea | 455/456.2 |
| 6,782,265 B2 * | 8/2004 | Perez-Breva et al. | 455/456.1 |
| 6,873,852 B2 * | 3/2005 | Koorapaty et al. | 455/458 |
| 6,999,780 B1 * | 2/2006 | Zhao | 455/456.5 |
| 7,000,015 B2 * | 2/2006 | Moore et al. | 709/224 |
| 7,116,988 B2 * | 10/2006 | Dietrich et al. | 455/456.1 |
| 7,155,236 B2 * | 12/2006 | Chen et al. | 455/454 |
| 7,272,254 B2 * | 9/2007 | Shankarappa et al. | 382/149 |
| 7,299,056 B2 * | 11/2007 | Anderson | 455/456.1 |
| 2001/0022558 A1 * | 9/2001 | Karr et al. | 342/450 |
| 2003/0064734 A1 * | 4/2003 | Stilp et al. | 455/456 |
| 2003/0096622 A1 * | 5/2003 | Moilanen | 455/456 |
| 2007/0001867 A1 * | 1/2007 | Rowe et al. | 340/825.49 |

FOREIGN PATENT DOCUMENTS

WO       03/044986 A1       5/2003

OTHER PUBLICATIONS

Kim, H-Y, et al "Mobile positioning using improved least squares algorithm in cellular systems," IEICE Transactions on Communications, Institute of Electronics Information and Comm. Eng., Tokyo, Japan, vol. E84-B, No. 1, Jan. 2001.

* cited by examiner

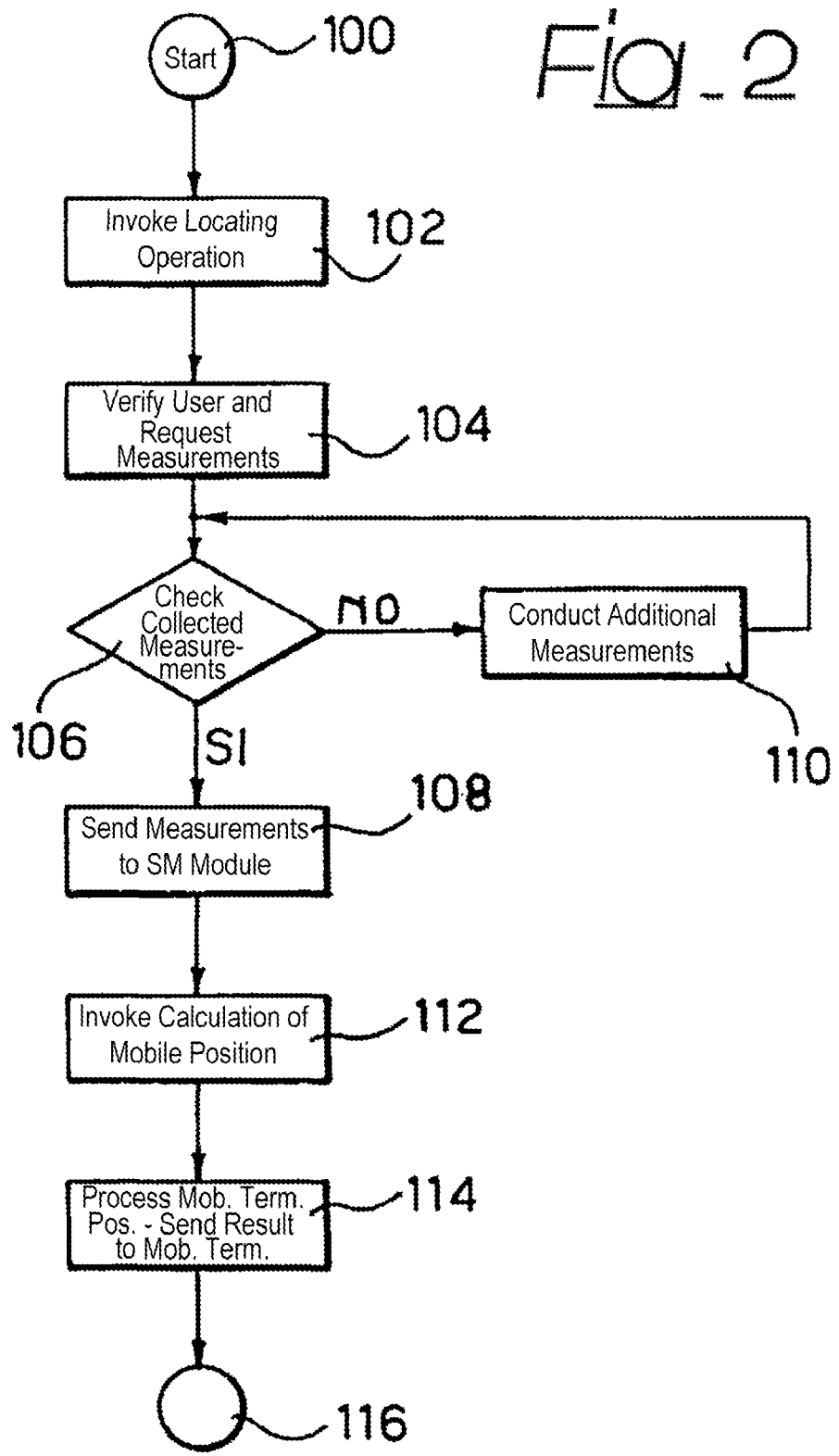

METHOD FOR LOCATING MOBILE TERMINALS, SYSTEM AND COMPONENTS THEREFOR

TECHNICAL FIELD

The present invention relates to the geographic location of mobile terminals within telecommunication networks.

BACKGROUND ART

In the prior art, various solutions are already known in which the terminals belonging to a mobile radio network are located on the basis of the physical signals and of the information available in the network, that is, without the aid of external equipments or systems, such as satellite positioning systems.

The various known solutions, aimed at allowing to locate mobile terminals on the basis of the physical signals and of the information available in the network, are distinguished from each other by the combination of two key aspects: the type of data provided to the position calculation system and the processing methodology applied to said data.

In regard to the first aspect, there are at least four types of physical quantities that can be measured by the mobile radio network and/or by the mobile terminal in order to obtain information useful for locating purposes.

In the first place, it is possible to measure the power received by the mobile terminal from a certain radio base station (currently indicated as BTS in the case of GSM and similar systems). This solution allows to obtain a circumference—centred on the base station under consideration—whereon, in an unknown point, lies the mobile terminal. Combining multiple power measurements and then intersecting the respective circumferences, the point where the mobile terminal lies can be identified. Power measurements are intrinsically inaccurate, because they are influenced by many uncontrollable factors, the most significant of which are antenna gain and fading, a phenomenon involving electromagnetic wave propagation, which cause the random and unpredictable fluctuation of the signal level.

It is also possible to measure the Timing Advance (TA), i.e. the "time of flight" of a reference signal such as a control burst between the base station and the mobile terminal (downlink) and, symmetrically, between the mobile terminal and the base station (uplink). Therefore, the value of TA indicates the distance between the mobile terminal and a base station. Like power measurements, TA also identifies a circumference whereon the mobile to be located lies. Combining multiple TA measurements (and then intersecting the corresponding circumferences) it is possible to identify the point where the mobile terminal lies. In the case of GSM and GPRS networks, TA measurements are inaccurate, both because of the ways by which they are taken, and because of the quantization error due to the finite number of bits used to store the measurement in the radio base station: in practice, the measure of TA allows to identify annuli with radial extension of about 550 m.

There are also the measurements of Observed Time Differences (OTD), obtained by measuring the difference between the distance from a mobile terminal and a base station and the distance from the same mobile terminal and an another base station. The OTD measurements describe hyperbolas that, appropriately combined, allow to locate the mobile terminal. The OTD measurements provide results that are intrinsically more precise than the two described above, because they are based on the measurement of the difference of the "times of flight" of an electromagnetic field (as evidenced by the fact that the GPS system, universally known as the most accurate positioning system currently available, is based on the same type of measurements).

Lastly, there are the measurements of Time of Arrival (TOA), entirely similar to the OTD measurements with the difference given by the fact that the measurement is taken by the network and not by the mobile terminal.

Both OTD measurements and TOA measurements have the drawback derived by the fact that, to yield accurate result, they require an exact synchronisation between the base stations: this condition requires to be achieved the presence, within the network, of additional synchronisation devices.

The four types of measurements described above are used to calculate the position of a mobile terminal both operating in an absolute way, i.e. intersecting the geometric loci described by the measurements taken, and comparing the available measurements with maps prepared a priori.

In the prior art there are different systems based both on the first method (power) and on the second method (TA), which are further differentiated by the type of measurements whereon the locating operation is based.

For instance, in U.S. Pat. No. 5,613,205 the position of a mobile terminal is estimated by intersecting the geometric loci derived from the combination of OTD and power measurements.

In WO-A-0018148 and U.S. Pat. No. 6,167,274, in order to locate a mobile terminal, the measurements of the power received by the mobile from a certain number of base stations are compared with a database which contains the power "signatures" of a certain area as a function of the geographic co-ordinates.

However, locating systems currently available in the art leave three fundamental issues unresolved.

In the first place, it is not considered that real locating scenarios are affected by measurement errors of various kinds, which have a considerable impact on locating accuracy (solutions like the one described in the document U.S. Pat. No. 5,613,205 in fact consider only some of the more relevant errors). Among the main errors to be considered are those made in geo-referencing the base station (typically in the order of a few tens of meters with peaks in the order of hundreds of meters), in measuring the times OTD and TOA due to the lack of synchronisation of the base stations (typically with geometric equivalents in the order of tens of meters), in measuring the power received by a mobile due to antenna gains and fading and, lastly, in measuring all mentioned parameters due to the systematic and intrinsic errors of the measurements themselves and to the multipath of the physical signals.

As a consequence of these errors, known locating systems yield poor accuracy. Moreover, for the methods based on the intersection of geometric loci, the various measurements can also diverge, preventing the estimation of the mobile terminal position: in fact, due to the movement of the geometric loci caused by the errors, there can be either no intersection or more than one. In the second place, for the methods that are based on the comparison between the signals received by the terminal and a database of "geographic signatures" of the signals, it is necessary to constantly update the database as the mobile radio network evolves. This updating operation is far from simple and the common risk is to compare the received signals with an obsolete database. Moreover, for practical reasons, the database is built using data calculated with mathematical models. Even in the best cases, this entails a difference relative to the values measured by the terminal in the field, and is another source of errors (see for instance U.S. Pat. No. 6,167,274).

Lastly, the methods presented in the literature and commonly known are not able to combine all types of measurements (power, TA, OTD and TOA) in a flexible way, but are limited at most to combine them in a rigid fashion, for instance, OTD measurements and power measurements (see U.S. Pat. No. 5,613,205). Consequently, when the prescribed measurements are not available, the locating system is incapable of adapting itself to the real measurement scenario, which it has to deal with, and therefore it is not able to perform its functions.

DESCRIPTION OF THE INVENTION

The present invention is aimed at providing a solution able to overcome the drawbacks described above.

According to the present invention, said aim is achieved with a method having the characteristics specifically listed in the claims that follow.

In particular, the invention relates to a method for identifying the position of mobile terminals: on the basis of a plurality of signals or physical quantities, corresponding error functions are determined which allow to calculate a global error function having a minimum in correspondence with the position of the mobile terminal to be located.

The invention also relates to the corresponding system and the associated components.

Among said components it is also included a software product able to be loaded directly in the memory of a digital computer (as is the case of currently produced mobile telephones) associated with a mobile terminal for telecommunication networks. The software product under investigation comprises portions of software code that can implement at least a part of said integrated locating module, according to the invention, in the mobile terminal itself when the software product is run on said digital computer.

BRIEF DESCRIPTION OF THE DRAWINGS

The invention will now be described, by the means of a non-limiting example and with reference to the accompanying drawings, in which:

FIG. 2 is a flow chart illustrating the implementation of the method according to the invention.

DESCRIPTION OF A PREFERRED EMBODIMENT

Figure 1:
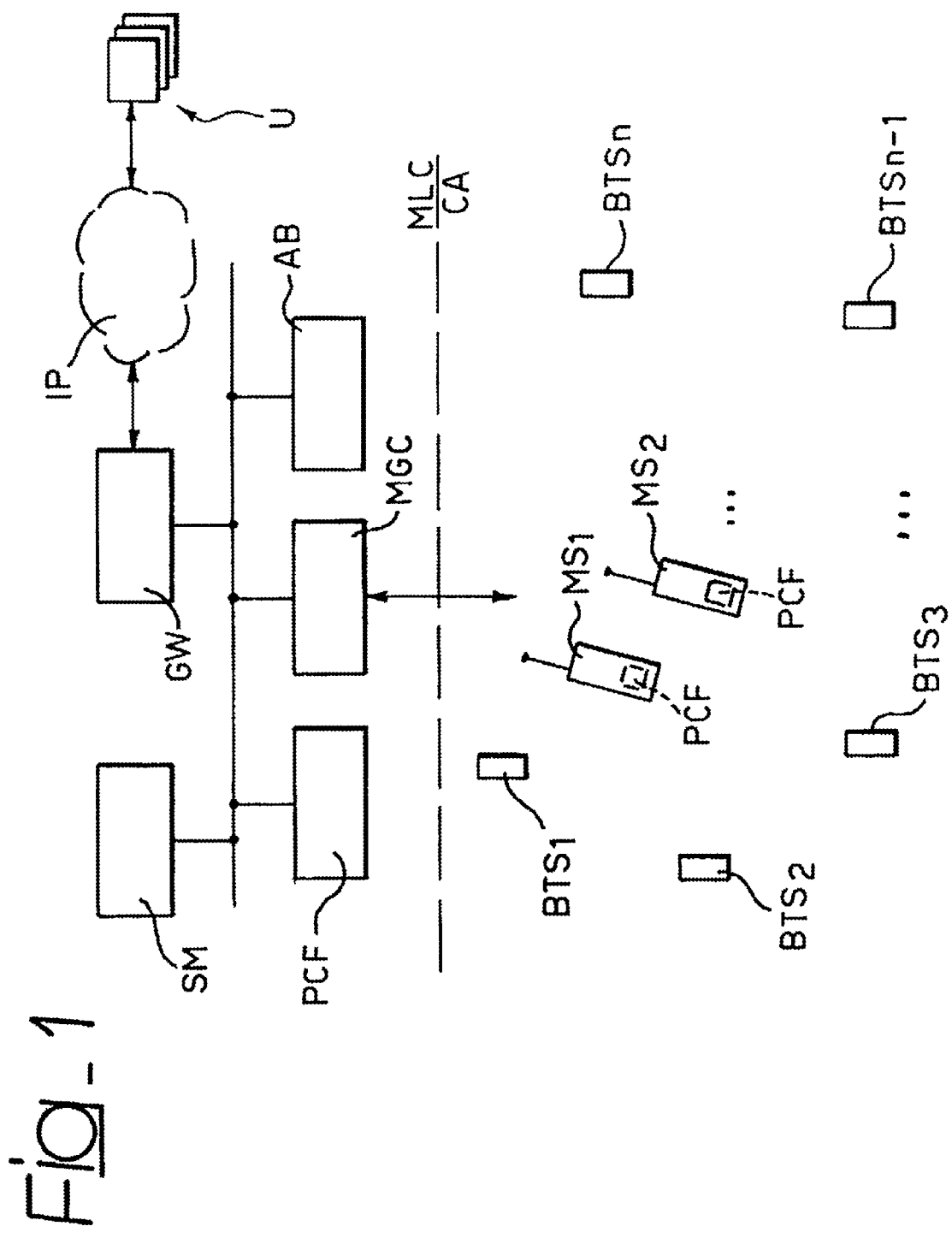
FIG. 1 shows, in the form of a functional block diagram, the organisation of the system according to the invention.

The diagram of FIG. 1 shows a preferred embodiment of the invention, with reference to the interaction between a "communication" or "network" environment, designated as CA, and a "locating" environment: the latter can be seen essentially as an implementation and development of a known locating function (Mobile Location Centre or MLC) already present in the network/system.

The CA communication environment essentially corresponds to a normal mobile radio network operating according to any GSM, GPRS, UMTS or equivalent standards, including new generation developments. The solution according to the invention is therefore "transparent" regarding the characteristic specifications of the CA communication environment.

The network under investigation thus comprises n (n>0) base stations (indicated for the sake of simplicity as BTS1, BTS2, . . . ) as well as one or more mobile terminals MS1, MS2 . . . .

The general operating criteria of such a network, whichever standard is adopted (GSM, GPRS, UMTS or others) are wholly known in the art and hence do not require a detailed description herein.

The locating environment MLC has the purpose of determining the position of mobile terminals MS1, MS2 . . . in terms of location co-ordinates (x, y) within the territory covered by the communication network.

The MLC environment mainly comprises:
 a supervision module SM overseeing all the operations of the locating system;
 an accounting and billing module AB, and
 a gateway module GW destined to act (according to criteria better described below) as an interface towards an IP network whereto are connected end users and/or service providers globally designated as U.

Within the locating environment MLC the following functions are provided:
 a position calculation function PCF, and
 a communication management function.

The communication management function is normally performed by dedicated modules one of which, indicated as MGC, resides at the fixed network level, for instance at a network management node. Each of the mobile terminals MS1, MS2 . . . is also provided—in a manner known in itself—with a corresponding communication management module, not explicitly illustrated in the drawings.

In an additional embodiment, the terminals can also be provided with optional devices to conduct measurements to complement those carried out by the network. For instance, the terminals can comprise an altimetryi, pressure measuring devices, devices able to measure distances, etc., such as to allow to identify, with a determined level of precision, at least one geographic co-ordinate or a distance from a predetermined geographic co-ordinate. The availability of such devices allows to provide the PCF function with additional information able to enhance locating precision, as shall be described in detail below.

The aforesaid optional devices can also be installed in the BTS, as is readily apparent to a person versed in the art.

If the measurements do not vary over time, for instance, in a determined area, such measurements can be inserted, in the form of appropriate static values or functions for their calculation, in the SM module so that, through the GW module, they are transferred to the PCF function.

The position calculation function can instead reside at the network level (as shown in continuous lines in the accompanying drawings), at the level of the mobile terminals MS1, MS2 . . . (as indicated with dashed lines in the accompanying drawings), and also at both levels. Therefore, the specific solution selected is dictated by system design considerations (processing power available in the various locations, etc. . . . ) and in fact it has no bearing on the understanding of the invention.

The currently preferred embodiment of the invention provides two possible operating modes, i.e.
 locating operation invoked by the individual mobile terminal involved
 locating operation invoked by the supervision SM module.

If one of the mobile terminals MS1, MS2 . . . invokes the locating operation, the determination of its position entails the completion of the following operations:
 the mobile terminal involved MS1, MS2 . . . selects the set of data whereon the position is to be calculated (dynamic or pre-set selection); if said set includes the TOA data, the mobile terminal must require from the network said values which are provided for instance via SMS or an ad-hoc data communication protocol;

the mobile terminal measures the values of the set defined above;

the mobile terminal requests from the network the geographic positions of the base stations whereto the above measurements refer, and the network communicates them to the mobile terminal, for instance by means of broadcast or SMS;

the PCF function in the mobile terminal computes the position of the terminal itself;

only if required, the position just calculated is sent (for instance via SMS or ad hoc data communication protocol) to the supervision module SM in view of possible additional processing in order to provide additional services (for instance tracking, tourist guide, transmission of information that depends on geographic position, etc.), such data being obtained for instance from providers U through the IP network.

If the supervision module SM invokes the locating of a determined mobile terminal, the following operations are carried out:

the set of data on which the position is to be calculated is selected. If said set includes the OTD data, the supervision module SM must request the involved mobile terminal to provide said values that are provided for instance via SMS or ad-hoc data communication protocol;

the values of the set considered above are measured;

the PCF function at the MLC level calculates the position of the mobile terminal;

only if requested, the position just calculated is sent (for instance via SMS or ad hoc data communication protocol) to the mobile terminal usually together with the other information (tourist guide, transmission of information which depends on the geographic position, road map of the area, etc.) already seen above.

Once again it is stressed that the solution according to the invention is applicable to any mobile radio network (GSM, GPRS, UMTS or others) that complies with the related international specifications and comprises a certain number of radio base stations, mutually connected by means of a core network, and a certain number of mobile radio terminals whose geographic position (for instance latitude and longitude) is to be estimated.

The core of the locating system illustrated herein is constituted by the PCF function, destined to calculate the position of the mobile terminal.

For this purpose, the PCF function, regardless of its location, receives at its input the data needed to calculate the position (level of power received by the terminal, TA, OTD, TOA or a combination, even incomplete, thereof) and provides at its output the unknown position of the mobile. Since some data among those mentioned can be measured either by the network alone (TOA) or by the mobile terminal alone (OTD), communication protocols are used (implemented by the MGC communication management function) which transfer them from the mobile terminal to the network and vice versa.

In particular, if the PCF function resides on the mobile terminal and it is necessary to use the TOA data because the other data are not available, the supervision module SM (the only one that knows the TOA data) makes such data available to the mobile terminal.

In wholly similar fashion, if the PCF function resides on the network, the mobile terminal involved in the locating action makes available to the network, if this is necessary, the data which the network cannot measure (e.g. OTD).

All this while the gateway GW (preferably constructed according to the standard ETSI TS 101.724 V.7.3.0 (2000-02)—"Digital cellular telecommunications system (Phase 2+); Location Services (LCS); (Functional description)—Stage 2; (GSM 03.71 version 7.3.0 Release 1998)" manages the information security and the routing of the information between IP network and the locating system.

Regardless of where it is physically located, the PCF function for calculating the position operates by minimising a combination of error functions defined in the manner described below, where (x,y) are the (unknown) co-ordinates of the terminal, n is the number of available base stations and dist calculates the absolute distance between two points:

for TA measurements:

$$f_j(x,y) = \text{dist}(MS, BTS_j) - TA_j, j=1, \ldots, n$$

for OTD measurements:

$$f_k(x,y) = \text{dist}(MS, BTS_i) - \text{dist}(MS, BTS_j) - OTD_{i,j}, i,$$
$$j=1, \ldots, n; k=1, \ldots, n!/2$$

It will be appreciated that the above also applies, respectively:

to power measurements, because, similarly to what is defined for TA measurements, they are circumferences centred on the reference base station to TOA measurements, because they are simply measurements similar to the OTD measurements, but carried out by the network instead of the terminal to other measurements, for instance measurements of altitude over mean sea level, obtained by means of optional devices; in this case, they are curves that depend on the type of physical dimensions measured and that, for instance, in the case of heights over mean sea level, can be represented as a quadratic function proportional to the altitude difference between what is indicated by the device, for instance an altimeter, and the actual altitude of the mobile terminal, in the following form:

$$f_h(x,y,z) = (z - z_{altimeter})^2$$

in which $z_{altimeter}$ is the altitude indicated by the altimeter.

For other types of measurements, as will be readily apparent to those versed in the art, distance functions corresponding to the measurements carried out can be used.

It will be appreciated that any optional measurements as mentioned above allow the method to carry out the locating operation, improving both its calculation times and its precision.

Consider, for instance, the additional measurement of the altitude of the terminal MS above the mean sea level. In this case the locating method is very efficient because the altitude measurement limits the field of existence of the solution itself to a determined iso-altimetric curve or to a set of values proximate to the identified measurement.

The locating method can thus derive considerable advantages therefrom, in terms of velocity of convergence of the PCF function in seeking the minimum value, at least with respect to the times to be expected if all co-ordinates were unknown. In fact, to the function $f_h$, as exemplified, can be given a high weight in the global error function (since $f_h$ is based, for instance, on $z_{altimeter}$ which is a very precise measurement) thereby allowing the iterative process to reach the exact altitude in just a few steps, and, just as fast, to converge with the other two co-ordinates, for instance x and y, which, as will be readily apparent to a person versed in the art, are forced to move around a curvilinear abscissa.

Moreover, knowledge of the altitude of the terminal MS also allows to improve locating precision, because this knowledge provides more precise information than the other available measurements (OTD, TA, . . . ) and such as to constrain the solution in an area around the exact point.

It will be appreciated that both for the terms $TA_j$ and for the terms $OTD_{ij}$ (or equivalent for power and TOA measurements) in general expressions of the following type apply $$TA_j = ta_j \cdot c \pm \epsilon_{taj}$$

$$OTD_{ij} = otd_{ij} \cdot c \pm \epsilon_{otdj}$$

where c indicates the speed of light in a vacuum, the term in lower case letters expresses the "exact" value of the measurement and the term e expresses the error component.

All measurements conducted and available are sent to the PCF function where they are combined in a global error function (or, rather, functional) $\Phi(f_i)$ whose minimum is sought with the variation of the x, y co-ordinates of the mobile terminal.

In particular, considering m available functions—corresponding to a total of m measurements of power and/or OTD and/or TA and/or TOA—the PCF function operates seeking the minimum value of $\Phi$ $$\min_{x,y} \Phi(f_i) \; i = 1, \ldots, m$$

where $\Phi(f_i)$ can be, for example, $\Phi = \Sigma f_i^2$ or $\Phi = var(f_i, 0)$ with i=1, . . . , m or yet other functions which minimise total error contribution and where m depends on the number of basic measurements available.

The function $\Phi$ is thus continuous in the plane x, y and has a local minimum in which the total error contribution of all functions $f_i$ with i=1, . . . , m is minimum.

The minimum can be equal to 0 (zero) only if the measurement errors of physical dimensions such as power, TA, OTD, TOA etc. are null.

In general, this situation is impossible in real cases.

The x, y co-ordinates in which the global error function $\Phi$ is minimum, correspond, according to the present invention, to the position co-ordinates of the mobile terminal with maximum probability.

As an example of application of the criterion described above, consider the case in which the mobile terminal involved in the locating action measures the TA relative to the serving radio base station and also measures the OTD relative to another radio base station. In this case, there are two available error functions:

$$f_1(x,y) = \sqrt{(x-X_1)^2 + (y-Y_1)^2} - TA_1$$

$$f_2(x,y) = \sqrt{(x-X_2)^2 + (y-Y_2)^2} - \sqrt{(x-X_1)^2 + (y-Y_1)^2} - OTD_{12}$$

where (x,y) are the unknown co-ordinates of the mobile terminal and $(X_1, Y_1)$ and $(X_2, Y_2)$ are, respectively, the co-ordinates of the first and of the second base station.

The position of the mobile terminal can therefore be calculated by the PCF function $$(x, y) = \min_{x,y} \{var(f_1(x, y), f_2(x, y), 0)\}$$

where "var" indicates variation.

The position thus found is not affected by the geo-referencing errors of the base stations (errors always present in real mobile radio networks), by the synchronisation errors of the base stations themselves and by the errors in measurement of the various reference dimensions (powers, TA, OTD and TOA).

The solution described performs an operation of minimisation of said errors and, naturally, if the errors mentioned above were null, each function $f_j$ would have a zero in the position occupied by the mobile terminal.

In the presence of the aforesaid errors, the function reaches in any case a minimum (and not a zero) in the point where it is most plausible that the mobile is located because the total error contribution is minimal.

In other words, the solution according to the invention is not limited to seeking the intersection of geometric regions (hyperbolas, circumferences, etc.), which in the presence of the above errors could not exist, but derives the point in which the mobile terminal is most plausibly located, thereby compensating for the various errors.

Calculation of the minimum can take place with various methods, for example with Newton's method, which is well known in mathematics and quite proven. All methods share the fact that the search for the minimum always converges to a solution and that this solution is the result of an iterative process that starts from a point $(x_0, y_0)$ and that, moving in the x,y plane on a succession of points $(x_1, y_1), \ldots, (x_n, y_n)$ converges to the point in which the function has a relative minimum. The iterative process stops in a point $(x_n, y_n)$ when the absolute distance between the point itself and the previous one $(x_{n-1}, y_{n-1})$ is less than a certain threshold, for instance 10 m.

The solution described herein is extremely flexible because it is applicable when even a single radio base station is available.

It will be appreciated that even the—precise—determination of the location of a mobile terminal on a circumference centred around a base station constitutes a location, both in itself (insofar as it is sufficient to know which distance separates the mobile terminal from base station), and in that it can be combined to other mechanisms or information able to identify the position of the mobile terminal on a determined portion of the circumference.

The solution described herein is applicable to any type of measurement and to any combination of the available measurements, as it adapts on each occasion to the contingent situation of the measurement scenario.

In particular, the solution described herein is applicable in a three-dimensional reference system, for instance using measurements able to determine the height of the MS terminal above mean sea level.

In fact, in the case of a three-dimensional reference system, it is sufficient to express the PCF function for seeking a minimum value in co-ordinates x, y, z instead of in co-ordinates x, y without changing anything in the method described.

In this case, the iterative process will start from a point $x_0$, $y_0$, $z_0$ to converge to a solution $x_n$, $y_n$, $z_n$, when the absolute distance between the point itself and the previous one $x_{n-1}$, $y_{n-1}$, $Z_{n-1}$ is smaller than a determined threshold, for example 10 m.

In reference to the flow chart of FIG. 2, from the viewpoint of the locating system in the example described above, the following actions, starting from an initial step, designated as 100, are accomplished:

the mobile terminal (or the SM supervision module, possibly upon command from an end user or a service provider U, through the IP network) invokes the locating operation (step 102);

the supervision module SM verifies through the AB module that the user that requested the locating operation is enabled for the service and requests the mobile terminal to provide the measurements whereon the locating operation is to be performed (step 104);

supposing that, based on the choice made by the SM module, either the or one of the PCFs residing at the network level has to calculate the position of the mobile terminal (and not the or one of the similar functions residing on the mobile terminal), the mobile terminal collects the basic measurements available (in this example a measure of OTD and one of TA) and, after verifying whether they are sufficient (positive outcome of a step 106) sends them to the SM module (step 108);

if the number of basic measurements obtained by the terminal is not sufficient (negative outcome of the step 106), the SM module conducts additional measurements (for instance of TOA), as indicated in the step 110, the SM module invokes the calculation of the mobile position from the PCF function (step 112), and the module SM processes the position of the mobile terminal adding value-added information (for instance, advertising) and sends the result to the terminal (step 114, followed by a final step designated as 116).

As stated previously, the locating request can be initiated both by the mobile terminal and by the SM module, which in turn can do so directly based on a scheduling table or on request by an outside user or a service provider connected through IP network.

In the first case, the mobile terminal directly conducts the measurements of the power received by the base station, the related OTD, the value of TA for the serving base station and it may request from the network the measurements of TOA (which the mobile terminal cannot take autonomously) in addition to the geographic co-ordinates of the station, for instance by means of broadcast messages according to the RRLP protocol (Radio Resource Link Protocol).

The PCF function on the mobile terminal estimates the position on the basis of the information received following the described methodology. The information is displayed on the mobile terminal or sent to the SM module for additional processing in order to provide the client with value added services based on the geographic position of the mobile (e.g. yellow pages, tracking, etc.).

If, instead, it is the module SM that invokes the locating of the mobile terminal the function PCF on the network collects the necessary data, possibly requesting the mobile terminal to provide the OTD measurements (for instance by means of the RRLP protocol) and then calculates the position of the mobile. The PCF function then returns to the mobile terminal, for instance via SMS, its position and/or other value-added information that depend on the calculated position.

From the above, it is evident that the locating system according to the invention can also operate in the presence of the combination of multiple errors in the space and time reference systems, such as the geo-referencing errors of the radio base stations, the synchronisation errors of the radio base stations and the errors in the measurement of the data to be used for locating purposes.

The system, according to the invention, can combine in wholly flexible manner a variable number of power measurements taken by the mobile terminal, of TA, of OTD and of TOA with the only limitation that at least one measurement is indispensable.

The system, according to the invention, thus overcomes the limitations of traditional positioning methods, based on the comparison between the received signals and those that should be received on maps prepared a priori (which, additionally, for practical reasons need to be traced using mathematical models which may introduce a difference from the actual situation) and which entail their continuous updating as the mobile radio network evolves.

Lastly, the system, according to the invention, is not based on the search for the intersection of geometric curves, intersection which may not exist due to space and time reference errors.

Naturally, without varying the principle of the invention, the implementation details and the embodiments may vary from what is described and illustrated herein, purely as examples, without thereby departing from the scope of the invention.

The invention claimed is:

1. A method for locating a mobile terminal within a mobile communication network comprising at least one base station, the method comprising the steps of:

measuring a set of physical dimensions that identify, according to respective functions, locating coordinates of said mobile terminal, the set of physical dimensions comprising any combination of physical dimensions selected from the group comprising signal power received by the mobile terminal starting from the base station, timing advance, observed time differences, and time of arrival, generating, starting from said set of physical dimensions and respective functions, a global locating error function which has a minimum for values of said locating co-ordinates corresponding with the position occupied by said mobile terminal, seeking the minimum of said error function by varying at least one of said locating co-ordinates, and locating said mobile terminal in correspondence with the value of said at least one locating co-ordinate corresponding to said minimum.

2. The method as claimed in claim 1 wherein the measuring step comprises the step of: performing measurements able to identify at least a value of position or distance with determined precision.

3. The method as claimed in claim 1 wherein said global error is defined as the mean square error of the dimensions of said set.

4. The method as claimed in claim 1 wherein said global error function is obtained starting from a plurality of dimensions of said set.

5. The method as claimed in claim 1 wherein said set comprises one single dimension, so that said global error function is generated starting from the single dimension of said set.

6. The method as claimed in claim 1, further comprising the step of:

to seek said minimum, executing an iterative process evaluating said global error function for different values of said at least one location co-ordinate corresponding to successive different points of the space covered by said communication network.

7. The method as claimed in claim 6, further comprising the step of:

interrupting said iterative process when the absolute distance between two successive points is below a determined threshold value.

8. The method as claimed in claim 1 wherein it is applicable in a three-dimensional reference system.

9. A system for locating a mobile terminal within a mobile communication network comprising at least one base station, the system comprising at least a locating module configured to measure a set of physical dimensions that identify according to respective functions location co-ordinates of said mobile terminal, the set of physical dimensions comprising any combination of physical dimensions selected from the group comprising signal power received by the mobile terminal starting from the base station, timing advance, observed time differences, and time of arrival, said locating module being configured to:

generate, starting from said set of physical dimensions and respective functions, a global locating error function which allows a minimum for values of said locating co-ordinates corresponding with the position occupied by said mobile terminal, seek the minimum of said error function varying at least one of said locating co-ordinates, and locate said mobile terminal in correspondence with the value of said at least one locating co-ordinate corresponding to said minimum.

10. The system as claimed in claim 9, further comprising:

measuring devices able to obtain measurements to identify at least a position value of said mobile terminal or distance with a determined precision.

11. The system as claimed in claim 9 wherein said global error function is defined as the mean square error of the dimensions of said set.

12. The system as claimed in claim 9 wherein said locating module is configured to obtain said global error function starting from a plurality of dimensions of said set.

13. The system as claimed in claim 9 wherein said locating module is configured to obtain said global error function starting from one single dimension of the set.

14. The system as claimed claim 9 wherein to seek said minimum, said locating module is configured to carry out an iterative process for evaluating said global error function for different values of said at least one locating co-ordinate corresponding to the successive different points of the space covered by said communication network.

15. The system as claimed in claim 14 wherein said locating module is configured to interrupt said iterative process when the absolute distance between two successive points is below a determined threshold value.

16. The system as claimed in claim 9 wherein said error function is able to operate in a three-dimensional reference system.

17. The system as claimed in claim 9, further comprising:

a module to allow the exchange of data between said mobile terminal and said at least one base station to identify at least one dimension of said set.

18. The mobile terminal configured for use in a system as claimed in claim 9 wherein the terminal comprises at least part of said locating module integrated in the mobile terminal itself.

19. A computer readable medium having stored thereon instructions that, when executed, cause an apparatus to perform:

measuring a set of physical dimensions that identify, according to respective functions, locating coordinates of a mobile terminal, the set of physical dimensions comprising any combination of physical dimensions selected from the group comprising signal power received by the mobile terminal starting from the base station, timing advance, observed time differences, and time of arrival, generating, starting from said set of physical dimensions and respective functions, a global locating error function which has a minimum for values of said locating co-ordinates corresponding with the position occupied by said mobile terminal, seeking the minimum of said error function by varying at least one of said locating co-ordinates, and locating said mobile terminal in correspondence with the value of said at least one locating co-ordinate corresponding to said minimum.

20. A communication network comprising at least a base station and a plurality of mobile terminals, the network comprising a locating system as claimed in claim 9.

21. The communication network as claimed in claim 20, further comprising an interface module for interfacing with an IP network, said interface module being configured in such a way as to allow the transfer of:

an order to locate one of said mobile terminals starting from a source connected to said IP network, and delivery information generated by a source connected to said IP network, directed to said mobile terminals and referring to the location of at least one of said mobile terminals.

22. The communication network as claimed in claim 9 wherein the set of physical dimensions includes altitude over mean sea level.

23. The method as claimed in claim 8 wherein the set of physical dimensions includes altitude over mean sea level.

* * * * *